United States Patent [19]
Brendel et al.

[11] Patent Number: 5,193,353
[45] Date of Patent: Mar. 16, 1993

[54] HIGH CAPACITY HOT GAS HEATING SYSTEM FOR TRANSPORT REFRIGERATION SYSTEM

[75] Inventors: Thomas E. Brendel, Fayetteville; L. Thomas Lane, Manlius, both of N.Y.

[73] Assignee: Carrier Corporation, Syracuse, N.Y.

[21] Appl. No.: 726,090

[22] Filed: Jul. 5, 1991

[51] Int. Cl.$^5$ .................. F25B 41/06; F25D 21/06
[52] U.S. Cl. ............................. 62/196.4; 62/228.4
[58] Field of Search ............... 62/196.4, 228.4, 205

[56] References Cited

U.S. PATENT DOCUMENTS

| | | | |
|---|---|---|---|
| 3,133,426 | 5/1964 | Johnson | 62/196.4 |
| 3,332,251 | 7/1967 | Watkins | 62/196.4 X |
| 3,392,542 | 7/1968 | Nussbaum | 62/196.4 |
| 4,419,866 | 12/1983 | Howland | 62/228.4 |
| 4,735,055 | 4/1988 | Taylor et al. | 62/228.4 X |
| 4,765,150 | 8/1988 | Persem | 62/228.4 X |
| 4,856,291 | 8/1989 | Takahashi | 62/228.4 X |
| 4,903,495 | 2/1990 | Howland et al. | 62/196.4 X |

*Primary Examiner*—John Rivell

[57] ABSTRACT

A transport refrigeration system of the type which holds a set point temperature via heating and cooling cycles. The system includes a refrigerant circuit which includes a compressor, condenser, receiver, evaporator, and a mode selection means for selectively directing hot compressed refrigerant gas to the condenser, or, through a hot gas conduit to the evaporator. The system includes a prime mover, typically a diesel engine for driving the compressor. The system includes a first hot gas flow control means having a predetermined, limited, refrigerant flow capability for controlling the flow of refrigerant therethrough. It further includes a second hot gas flow means having a refrigerant flow capability which is substantially greater than the predetermined limited refrigerant flow capability of the first hot gas flow control means. The first and second hot gas flow control means are disposed in parallel fluid flow relationship in the hot gas conduit. Each of the hot gas flow control means is selectively operable to an open or closed condition. The hot gas flow control means may be opened or closed in any desired combination to achieve a desired hot gas flow rate through the hot gas line. In the preferred embodiment the predetermined limited refrigerant flow capability of the first hot gas flow control means is sufficiently small so that it will limit the suction pressure rise of the compressor to a level which will not overload the internal combustion engine.

10 Claims, 3 Drawing Sheets

HIGH CAPACITY HOT GAS HEATING SYSTEM FOR TRANSPORT REFRIGERATION SYSTEM

BACKGROUND OF THE INVENTION

1. Field of the Invention

The invention relates in general to transport refrigeration systems of the type which hold a set point temperature by way of heating and cooling cycles, and more specifically to such systems which utilize hot compressor discharge gas for heating.

2. Description of the Prior Art

In the transportation of perishable products, it is recognized that it is necessary to provide refrigeration for the cargo space. It is also well known that it is necessary to periodically provide heat to remove the accumulation of frost or ice from the refrigeration system evaporator. Also, when transporting perishable products through areas having a cold climate, it is necessary to provide heat to the cargo space to prevent excessive cooling or freezing of the perishable products.

A well known method for providing heat for defrost and heating cycles is to divert hot compressor discharge gas from the normal refrigeration circuit directly to the evaporator to achieve the desired heating. When such a system switches from cooling to heating or defrost a sudden rise in compressor suction pressure occurs, due to the sudden dumping of liquid refrigerant that has condensed in the heretofore dormant hot gas lines. When using higher pressure refrigerant such as R-502 or R-22, this pressure rise can stall the engine which drives the compressor. In the past, an orifice was installed in the hot gas line to minimize the instantaneous pressure rise to prevent stalling. This orifice, however, restricted refrigerant flow even when the over load protection was no longer needed.

SUMMARY OF THE INVENTION

It is an object of the present invention to control the flow of hot compressed refrigerant for providing heating to a cargo space in a manner to avoid stalling the prime mover and providing a high heating capacity.

It is another object of the present invention to provide an inexpensive reliable variable flow control arrangement for the hot refrigerant gas in a transport refrigeration system of the type which holds a set point by operating in heating and cooling cycles.

These and other objects of the present invention are achieved by a transport refrigeration system of the type which holds a set point temperature via heating and cooling cycles. The system includes a refrigerant circuit which includes a compressor, condenser, receiver, evaporator, and a mode selection means for selectively directing hot compressed refrigerant gas to the condenser, or, through a hot gas conduit to the evaporator. The system includes a prime mover, typically a diesel engine, for driving the compressor. The system includes a first hot gas flow control means having a predetermined, limited, refrigerant flow capability for controlling the flow of refrigerant therethrough. It further includes a second hot gas flow control means having a refrigerant flow capability which is substantially greater than the predetermined limited refrigerant flow capability of the first hot gas flow control means. The first and second hot gas flow control means are disposed in parallel fluid flow relationship in the hot gas conduit. Each of the hot gas flow control means is selectively operable to an open or closed condition. The hot gas flow control means may be opened or closed in any desired combination to achieve a desired hot gas flow rate through the hot gas line. In the preferred embodiment the predetermined limited refrigerant flow capability of the first hot gas flow control means is sufficiently small so that it will limit the suction pressure rise of the compressor to a level which will not over load the internal combustion engine when the system initially shifts from directing hot gas to the condenser to directing hot gas to the evaporator.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will be best understood from the following description of the preferred embodiment when read in connection with the accompanying drawings wherein:

DESCRIPTION OF THE PREFERRED EMBODIMENT

Figure 1:
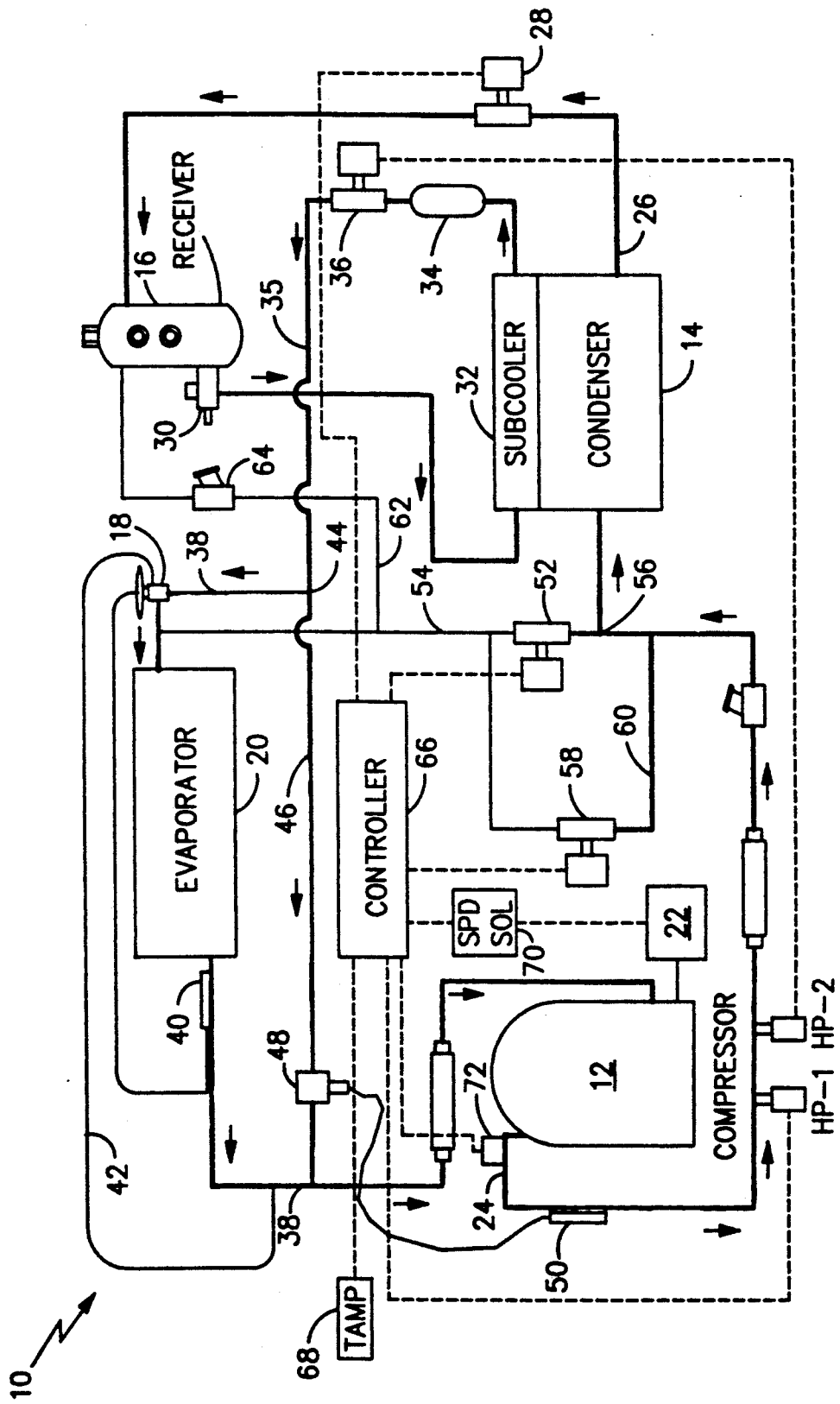
FIG. 1 is a diagrammatical representation of one embodiment of a transport refrigeration system embodying the principles of the present invention while operating in the cooling mode.
Figure 2:
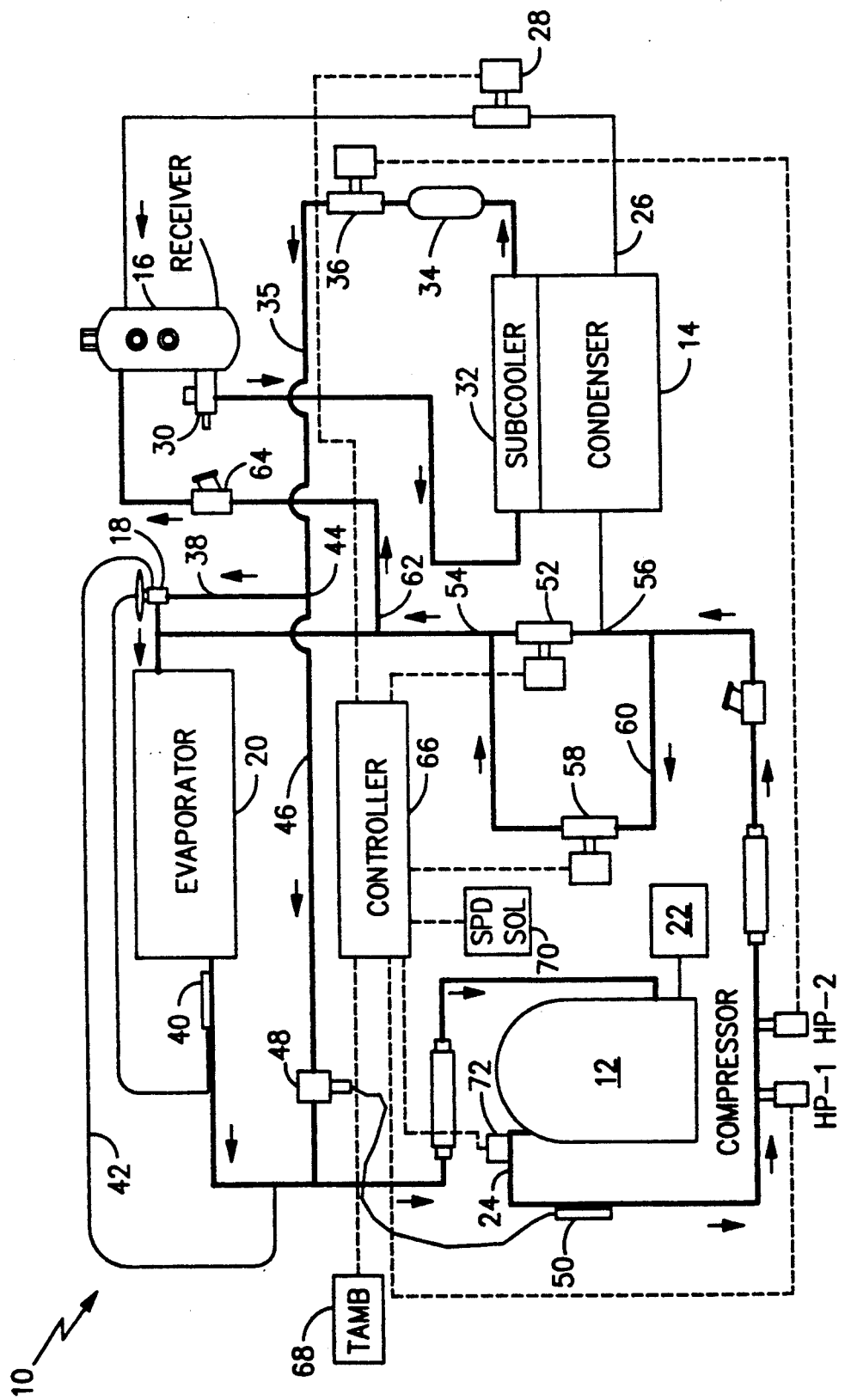
FIG. 2 is a diagrammatical representation of the embodiment of FIG. 1 operating in the heating or defrost mode.

Referring first to FIGS. 1 and 2, reference numeral 10, generally designates a compression refrigeration system of the type used in transport refrigeration applications. The system is designed to hold a set point temperature within a cargo space by way of heating and cooling cycles. The system 10 is of the type commonly referred to as a three-valve system for directing hot compressor discharge gas to the evaporator for heating or defrosting. The system 10 is typically mounted on the front wall of a truck or truck trailer. The system includes a reciprocating compressor 12. The compressor is in a refrigeration circuit which serially includes as its main components, the reciprocating compressor 12, an air cooled condenser 14, a receiver 16, an expansion valve 18, and a direct expansion evaporator 20.

Compressor 12 is driven by an internal combustion engine represented schematically by the box bearing reference numeral 22, in a conventional manner. The operation of the refrigeration circuit in the cooling mode of operation is conventional and will be briefly described in connection with FIG. 1 before a more detailed description of the system and the operation of the system as it applies to the heating and defrosting modes of operation. In FIG. 1 the path followed by the refrigerant during the cooling cycle is indicated by the directional arrows and the refrigerant conduits through which the refrigerant passes during the cooling cycle are represented by substantially heavier lines to facilitate understanding of operation of the system.

When the compressor 12 is driven by the engine 22, it compresses the refrigerant in the system, thereby raising its temperature and pressure and forces compressed refrigerant into the condenser 14, via compressor discharge line 24, where it condenses and passes, via refrigerant line 26 and normally opened solenoid valve 28, to the receiver 16.

The receiver 16 stores the additional refrigerant charge necessary for low ambient operation and for the heating and defrost modes. The refrigerant leaves the receiver 16 and flows through a manual receiver shut off valve 30 and through a sub-cooler 32. The sub-cooler 32 occupies a portion of the main condensing coils surface and gives off further heat to the passing air. From the sub-cooler the refrigerant flows through a filter dryer 34 where an absorbant keeps the refrigerant clean and dry. From the filter dryer the liquid refrigerant flows through the liquid line 35, which includes a normally closed liquid line solenoid valve 36, which starts or stops the flow of liquid refrigerant therethrough to the main thermostatic expansion valve 18. Liquid refrigerant passes through the expansion valve 18 and is partly flashed and dropped in pressure before reaching the evaporator 20 where the remaining liquid refrigerant evaporates and the gaseous refrigerant is returned via refrigerant line 38 to the compressor suction port to complete the cycle. The main expansion valve 18 is controlled by an expansion valve thermal bulb 40 and an external equalizer line 42.

Branching off from the liquid line 35 through a T-connection 44 is a quench liquid line 46 having a quench valve 48 located therein. The quench valve 48 is operated by a quench valve bulb 50 positioned on the compressor discharge line 24 which opens and closes the quench valve as required to maintain a desired compressor discharge temperature. This arrangement is used when refrigerants having a high discharge temperature, such as R-22, are used in the system.

The components associated with the hot gas heating and defrost system will be described and then the operation of the system, depending upon system conditions, will be described. A high capacity hot gas solenoid valve 52 is located in the hot gas line 54 which extends from a T-connection, 56 in the compressor discharge line 24. The other leg of the T-connection 56 establishes the fluid communication between the compressor discharge line 24 and the condenser 14. A second, low capacity or orifice, hot gas solenoid valve 58 is located in a bypass conduit 60 extending from the compressor discharge line 24 back to the hot gas line 54. This arrangement accordingly puts the high capacity hot gas flow valve 52 and the low capacity or orifice hot gas flow valve 58 in a parallel fluid flow relationship in the hot gas line 54. The other end of the hot gas line 54 is in direct fluid flow communication with the refrigerant line 38 to the evaporator 20. A branch conduit 62 extends from the hot gas line 54 into fluid communication with the receiver 16. A bypass check valve 64 is located in the branch conduit 62 which allows flow only in the direction from the hot gas line 54 to the receiver 16. While not shown in the drawing, the hot gas line also serves as a drain pan heater, as is conventional.

Automatic control of the refrigeration system is carried out by an electronic controller 66 which preferably includes a microprocessor having a memory storage capability and which is microprogrammable to program the operation of the system components. Of particular interest in connection with the present invention is control of the two hot gas solenoid control valves 52 and 58 and the condenser pressure control valve 28. Inputs to the controller 66 include signals from, an ambient temperature transducer 68, a compressor discharge temperature transducer 72, and an engine speed solenoid 70.

The engine speed solenoid provides the controller 66 with a signal indicative of the speed at which the internal combustion engine 22 driving the compressor is running. A compressor discharge pressure transducer HP-1, located on the compressor discharge line 24, also provides an input signal to the controller 66.

When the controller 66 calls for heating for either the heating of the cargo space or defrosting the evaporator, the normally closed hot gas orifice valve 58 will be actuated to an open condition and the condenser pressure control solenoid valve 28 will be actuated to a closed condition. When this occurs the condenser will fill with refrigerant, and hot gas from the compressor will pass via the hot gas bypass line 60 through the orifice control valve 58 and thence, via hot gas line 54, directly to the evaporator 20. At this point in time, a large quantity of liquid refrigerant which had heretofore been dormant and stored in the hot gas bypass 54 and the hot gas linepass line 60 is being introduced into the heating/defrost circuit. While this is happening, the orifice hot gas solenoid valve 58 limits the flow through the system such that the suction pressure of the compressor is limited to a level wherein the internal combustion engine 22 is not overloaded. After a predetermined period of time, under certain operating conditions which will subsequently described, the high capacity hot gas solenoid valve 52 will be opened to dramatically increase the flow of hot gas to the evaporator 20 and thereby increase the heating capacity of the system and/or increase the defrost capability and therefore decrease the time necessary to achieve defrost.

According to the preferred embodiment the internal combustion engine 22 has low and high speed modes of operation. Depending upon the load on the system the controller 66 will actuate the speed solenoid 70 to operate the engine in the speed mode which is most economical for the load on the refrigeration system. With this information available, the controller 66, following initiation of a heating or defrost cycle, and following the initial operation of the orifice hot gas solenoid valve 58 for the predetermined period of time will look at the speed at which the engine is running. If the controller 66 sees low speed operation it will continue to operate the orifice hot gas solenoid valve 58 in the open condition and will continue to operate the high capacity valve 52 closed. At this time, the additional heating capacity gained by opening the high capacity valve 52 is not necessary.

In a like manner, following the initial predetermined period of time operating with the hot gas orifice valve 58 open, if the controller determines that the engine is running in the high speed mode, the high capacity hot gas solenoid valve 52 will be opened.

According to a further control embodiment controller 66 processes the signals from the ambient temperature transducer 68 the compressor discharge temperature transducer 72 and determines the difference between these temperatures. With this information available the controller will continue to allow the orifice hot gas solenoid 58 to control the flow of hot gas if the engine is in low speed following the predetermined period of time. However, if the signal indicative of the speed mode indicates that the engine is in high speed, and, if the temperature difference between the compressor discharge temperature and ambient temperature is greater than a predetermined value the controller 66 will operate to open the high capacity hot gas solenoid value 52, after the predetermined period of time. Further, if after opening the high capacity valve 52, the controller determines that the difference between compressor discharge temperature and ambient temperature falls below another, lower, predetermined value, the high capacity valve 52 will be closed and the orifice valve 58 opened.

According to still another control feature, the controller 66 is programmed to process the signal from the compressor discharge pressure transducer HP-1, and, to determine the saturated discharge temperature, for the refrigerant being used, which corresponds to that pressure. The saturated discharge temperature, as determined by the controller is then compared to the actual temperature leaving the compressor, as indicated by the discharge temperature transducer 72. The difference between these temperatures is determined and this value is used in making the control decisions as discussed in the preceding paragraph.

According to yet another control feature, if the compressor discharge temperature is sensed to exceed a predetermined value the high capacity hot gas solenoid valve will open immediately overriding the predetermined time period and the high speed mode requirement.

During both the heating and defrosting mode of operation the liquid line solenoid valve 36 remains open allowing a flow of refrigerant through the branch conduit 62, through the check valve 64 to the receiver 16, and thence to the expansion valve 18 to allow additional refrigerant to be metered into the hot gas cycle providing additional heating capacity. This valve 36 remains open until de-energized by a head pressure control switch HP-2 located in the compressor discharge line 24.

According to the preferred embodiment the invention has been employed in a transport refrigeration system comprising a six cylinder reciprocating compressor driven by a four cylinder 134 cubic inch diesel engine. The system employed a refrigeration charge of 30 pounds of refrigerant R-22. The orifice flow control valve 58 was a solenoid actuated valve having a flow orifice of ¼ inch in diameter while the high capacity hot gas solenoid valve 52 was a solenoid valve having a flow opening of ½ inch. These sizes result in a relative refrigerant flow capability between the high capacity valve 52 and the orifice valve 58 of 4 to 1. It should be appreciated that the sizes of the valves must be selected to match the requirements of a particular refrigeration system. Generally speaking, the larger the overall capacity of the system, the larger the refrigerant flow capability required for both valves. It is contemplated that for most transport refrigeration systems, an orifice valve on the order of ¼ inch to 5/16 inch and a high capacity valve on the order of ½ inch to 1 inch would provide the desired hot gas flow control. Accordingly, it is believed that a relative size of the high capacity valve 52 on the order of about 2 to 16 times the flow capability of the orifice valve 58 would provide satisfactory operation.

The predetermined time, at the initiation of a heating or defrost cycle, during which the orifice valve 58 is open and the high capacity valve 52 is closed is also a function of the system. In the system described a delay time of 40 to 60 records has proved to provide satisfactory engine stall protection.

In any situation where the controller determines that the high capacity valve 52 should be opened, the orifice valve 58 may or may not be allowed to remain open. In the described systems, embodying the invention, the orifice valve 58 is left open. It may however, under certain circumstances, in a given system be desirable and advantageous to close the orifice valve at certain times when the high capacity valve is opened.

Figure 3:
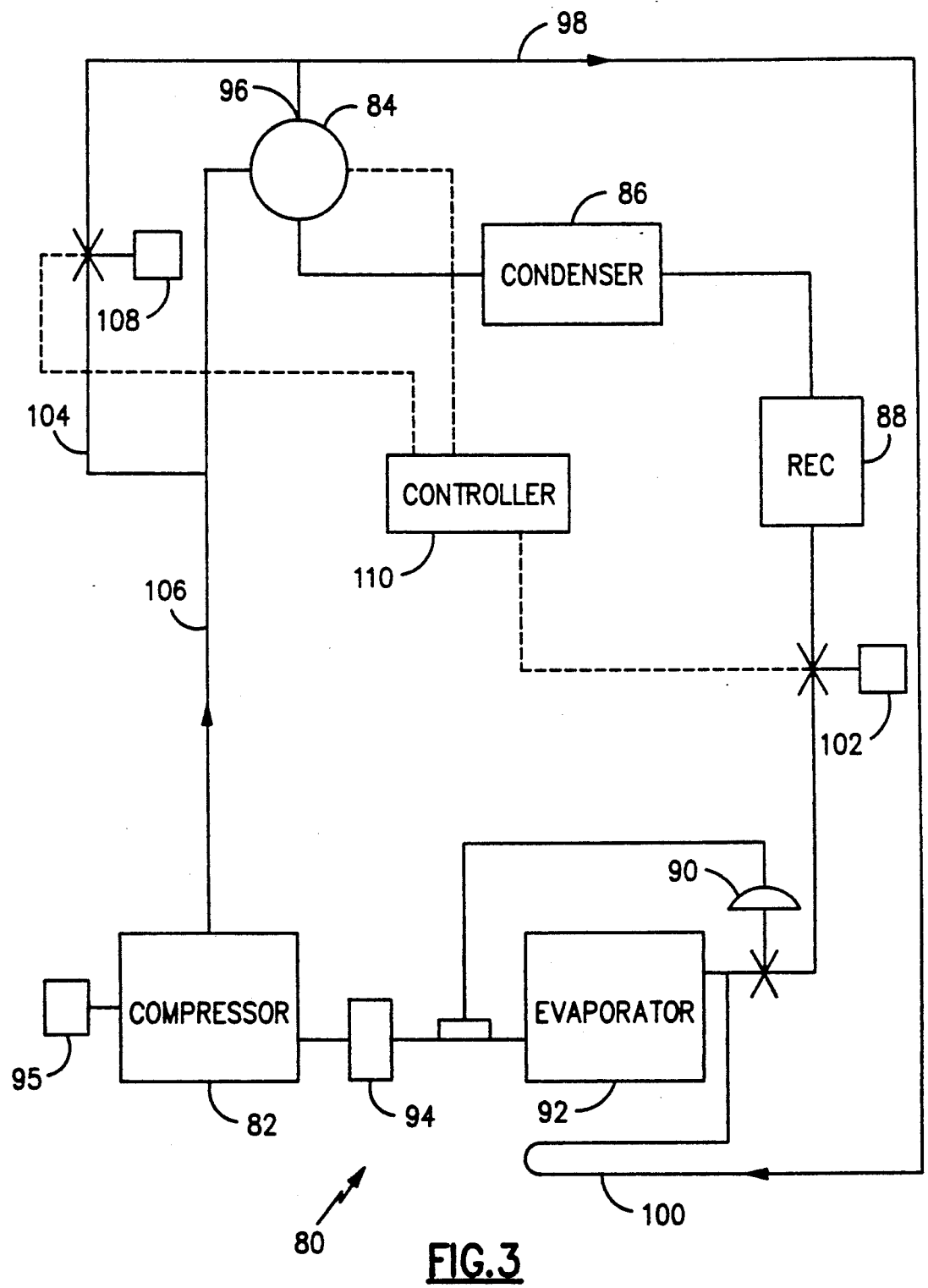
FIG. 3 is a diagrammatical representation of a second embodiment of a transport refrigeration system embodying the principles of the present invention.

Turning now to FIG. 3. A transport refrigeration system of the type referred to as a three-way-valve system embodying the present invention is generally indicated by reference number 80. This system includes as its principle components serially, a compressor 82, a three-way valve 84, a condenser 86, a receiver 88, a thermostatic expansion valve 90, an evaporator 92, and an accumulator 94.

The compressor 82 is driven by an internal combustion engine 95 in a conventional manner. The operation of this system in the refrigeration mode is conventional with the three-way-valve 84 actuated to direct hot compressor gas to the condenser 86 and through the refrigeration circuit in a conventional manner.

When it is desired to operate such a system in the heating or defrost mode the three-way-valve 84 is operated to block the flow of hot compressor discharge gas to the condenser 86 and to direct the hot gas from a second outlet 96 of the three-way valve 84 to direct it to a hot gas line 98. The hot gas line 98 conducts the hot gas to a drain pan heater 100 and then directly to the evaporator 92 for heating and defrost. The system includes a liquid line solenoid valve 102 downstream from the receiver 88.

A three-way valve bypass line 104 establishes fluid communication between the compressor discharge line 106 and the hot gas line 98. The hot gas bypass line 104 includes an orifice hot gas solenoid valve 108 therein.

As in the prior described system an electronic controller 110 controls the operation of the system components. Of particular interest in connection with the present invention is control of the three-way valve 84, the liquid line solenoid valve 102 and the orifice hot gas valve 108. As in the first described embodiment each of these valves is electrically actuable from a signal from the controller. In this system the three-way valve 84 serves as the high capacity hot gas valve, and, the orifice valve 108 serves as the low capacity valve which opened for the predetermined period of time according to the desired control parameters of the system. It should be understood that the control of these valves may be identical to those described in connection with the embodiment described above in considerable detail and such control schemes will not be repeated herein.

Accordingly, a transport refrigeration system of the type which holds a set point by operating in heating and cooling cycles has been provided with a variable flow control arrangement for the hot refrigerant gas so that the system may be operated in a manner to avoid stalling the prime mover and, for providing a high heating capacity.

What is claimed is:

1. In a transport refrigeration system of the type which holds a set point temperature via heating and cooling cycles, a refrigerant circuit which includes a compressor, condenser, receiver, evaporator, mode selection means for selectively directing hot compressed refrigerant gas to the condenser, or, through a hot gas conduit to the evaporator, the system further including an internal combustion engine for driving the compressor, the improvement comprising:

a first hot gas flow control means having a predetermined, limited, refrigerant flow capability for controlling the flow of refrigerant therethrough;

a second hot gas flow control mans having a refrigerant flow capability which is substantially greater than said predetermined limited refrigerant flow capability of said first hot gas flow control means, for controlling the flow of refrigerant therethrough;

said first and second hot gas flow control means being disposed in parallel fluid flow relationship in said hot gas conduit, each of said first and second hot gas flow control means being selectively operable to an open or closed condition, and, wherein;

said predetermined limited refrigerant flow capability provides a flow rate, which, when said mode selection means initially shifts from directing hot gas to the condenser, to directing hot gas to the evaporator, will limit the suction pressure rise of the compressor to a level which will not overload said internal combustion engine.

2. The apparatus of claim 1 wherein said internal combustion engine has a low speed mode of operation and a high speed mode of operation, further including;

means for generating a signal indicative of the speed mode of said internal combustion engine;

control means for receiving said signal indicative of the speed mode of said internal combustion engine, and;

if said signal indicates that said engine is operating at low speed, for operating said first hot gas flow control means to an open condition, and, for operating said second hot gas control means to a closed condition; and if said signal indicates that said internal combustion engine is operating at high speed, for operating said first hot gas control means to an open condition, and operating said second hot gas control means to a closed condition for a predetermined period of time; and after said predetermined period of time, for operating said second hot gas control means to an open condition.

3. The apparatus of claim 2 wherein, after said predetermined time said control means also operates said first hot gas control means to a closed condition.

4. The apparatus of claim 1 wherein said internal combustion engine has a low speed mode of operation and a high speed mode of operation, and, further including;

means for generating a signal indicative of the speed mode of said internal combustion engine;

means for determining the temperature of the refrigerant being discharged from the compressor;

means for determining the ambient temperature;

means for determining the difference between compressor discharge temperature and ambient temperature;

control means for receiving said signal indicative of the speed mode of said engine, and, for receiving said difference between compressor discharge temperature and ambient temperature, and;

if said signal indicative of the speed mode indicates that said engine is in low speed, for operating said first hot gas flow control means to an open condition, and, for operating said second hot gas control means to a closed condition; and if said signal indicative of the speed mode indicates that said engine is in high speed, and, if said temperature difference is greater than a predetermined value, for operating said first hot gas control means to an open position, and for opening said second hot gas control means to a closed condition for a predetermined period of time; and after said predetermined period of time, for operating said second hot gas control means to an open condition.

5. The apparatus of claim 4 wherein, after said predetermined time said control means also operates said first hot gas control means to a closed condition.

6. The apparatus of claim 4 wherein said control means includes, means for comparing said compressor discharge temperature to a predetermined value, and, for generating a control signal when said compressor discharge temperature exceeds said predetermined value;

said control signal operating said second hot gas control means to an open condition.

7. The apparatus of claim 1, further including;

means for determining the temperature of the refrigerant being discharged from the compressor; and control means for comparing said compressor discharge temperature to a predetermined value, and, for generating a control signal when said compressor discharge temperature exceeds said predetermined value, said control signal operating said second hot gas control means to an open condition.

8. The apparatus of claim 1 wherein said internal combustion engine has a low speed mode of operation and a high speed mode of operation, and, further including;

means for generating a signal indicative of the speed mode of said internal combustion engine;

means for determining the temperature of the refrigerant being discharged from the compressor;

means for determining the compressor discharge pressure;

means for determining the saturated discharge temperature of the refrigerant which corresponds to the compressor discharge pressure;

means for determining the difference between compressor discharge temperature and the determined saturated discharge temperature;

control means for receiving said signal indicative of the speed mode of said engine, and, for receiving said difference between compressor discharge temperature and saturated discharge temperature, and;

if said signal indicative of the speed mode indicates that said engine is in low speed, for operating said first hot gas flow control means to an open condition, and, for operating said second hot gas control means to a closed condition; and if said signal indicative of the speed mode indicates that said engine is in high speed, and, if said temperature difference is greater than a predetermined value, for operating said first hot gas control means to an open position, and for opening said second hot gas control means to a closed condition for a predetermined period of time; and after said predetermined period of time, for operating said second hot gas control means to an open condition.

9. The apparatus of claim 8 wherein, after said predetermined time said control means also operates said first hot gas control means to a closed condition.

10. The apparatus of claim 8 wherein said control means includes, means for comparing said saturated discharge temperature to a predetermined value, and, for generating a control signal when said saturated discharge temperature exceeds said predetermined value; said control signal operating said second hot gas control means to an open condition.

* * * * *